United States Patent
Wu et al.

(10) Patent No.: US 8,780,986 B2
(45) Date of Patent: Jul. 15, 2014

(54) REFRESH PIXEL GROUP SELECTION AND CODING ADJUSTMENT

(75) Inventors: Hsi-Jung Wu, San Jose, CA (US); Xiaosong Zhou, San Jose, CA (US); Xiaojin Shi, Fremont, CA (US); Yuxin Liu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1001 days.

(21) Appl. No.: 12/415,478

(22) Filed: Mar. 31, 2009

(65) Prior Publication Data

US 2009/0304077 A1 Dec. 10, 2009

Related U.S. Application Data

(60) Provisional application No. 61/059,721, filed on Jun. 6, 2008.

(51) Int. Cl.
*H04N 7/68* (2006.01)
*H04N 7/48* (2006.01)
*H04N 7/32* (2006.01)
*H04N 7/34* (2006.01)
*H04N 7/26* (2006.01)
*H04N 7/50* (2006.01)
*H04N 7/36* (2006.01)

(52) U.S. Cl.
CPC ......... *H04N 7/26031* (2013.01); *H04N 7/5086* (2013.01); *H04N 19/0003* (2013.01)
USPC ................. 375/240.13; 375/240.27

(58) Field of Classification Search
CPC ............ H04N 7/5086; H04N 7/26031; H04N 19/0003
USPC ...................................... 375/240; 348/231.99
See application file for complete search history.

(56) References Cited

U.S. PATENT DOCUMENTS

| | | | | |
|---|---|---|---|---|
| 5,057,916 | A * | 10/1991 | Krause et al. | 375/240.12 |
| 5,825,425 | A * | 10/1998 | Kazui et al. | 375/240.24 |
| 6,002,802 | A * | 12/1999 | Chujoh et al. | 382/236 |
| 6,084,914 | A * | 7/2000 | Katata et al. | 375/240 |
| 6,333,946 | B1 * | 12/2001 | Miyashita et al. | 372/46.01 |
| 6,611,561 | B1 * | 8/2003 | Hannuksela et al. | 375/240.27 |

(Continued)

FOREIGN PATENT DOCUMENTS

| | | | | |
|---|---|---|---|---|
| EP | 1439714 A2 * | 7/2004 | | H04N 7/68 |
| EP | 1583369 A2 * | 10/2005 | | H04N 7/50 |
| WO | WO 9814011 A1 * | 4/1998 | | H04N 7/50 |
| WO | WO 2007038698 A2 * | 4/2007 | | H04N 7/50 |

*Primary Examiner* — Dave Czekaj
*Assistant Examiner* — David N Werner
(74) *Attorney, Agent, or Firm* — Kenyon & Kenyon LLP

(57) ABSTRACT

Apparatuses and methods for improving coding processes and coding parameters for coding video data are provided for. A coder may select coding parameters for video data according to a default coding policy. The default coding policy may include selection of prediction modes (e.g., intra-coding or inter-coding) for each pixel group in each frame. A video coder may select some pixel groups in a frame to be coded as refresh pixel groups as an exception to the default assignment policies. The selection of refresh pixel groups may be based on prediction relationships among multiple frames of source video data. The default coding of the refresh pixel groups is then modified to enhanced the coding of the refresh pixel groups. The refresh pixel groups may permit fewer intra (I) frames be sent and/or may improve the quality of the recovered video.

44 Claims, 7 Drawing Sheets

(56) References Cited

U.S. PATENT DOCUMENTS

| | | | |
|---|---|---|---|
| 6,907,072 B2 * | 6/2005 | Kawakatsu et al. | 375/240.13 |
| 7,020,203 B1 * | 3/2006 | Horowitz et al. | 375/240.24 |
| 7,110,450 B1 * | 9/2006 | Kimoto | 375/240 |
| 7,310,445 B2 * | 12/2007 | Kupeev et al. | 382/173 |
| 8,102,917 B2 * | 1/2012 | Vanhaelewyn et al. | 375/240.16 |
| 2002/0172283 A1 * | 11/2002 | Kawakatsu et al. | 375/240.13 |
| 2003/0227972 A1 * | 12/2003 | Fukuda | 375/240.13 |
| 2005/0111744 A1 * | 5/2005 | Kupeev et al. | 382/243 |
| 2005/0201470 A1 * | 9/2005 | Sievers | 375/240.24 |
| 2005/0207499 A1 * | 9/2005 | Hwang et al. | 375/240.16 |
| 2006/0056519 A1 * | 3/2006 | Horowitz et al. | 375/240.27 |
| 2006/0078051 A1 * | 4/2006 | Liang et al. | 375/240.24 |
| 2006/0104366 A1 * | 5/2006 | Huang et al. | 375/240.27 |
| 2006/0256870 A1 * | 11/2006 | Morimoto | 375/240.24 |
| 2008/0253452 A1 * | 10/2008 | Vanhaelewyn et al. | 375/240.12 |
| 2009/0103617 A1 * | 4/2009 | Au et al. | 375/240.13 |
| 2009/0226107 A1 * | 9/2009 | Lin | 382/238 |
| 2009/0279603 A1 * | 11/2009 | Chen et al. | 375/240.02 |
| 2010/0172412 A1 * | 7/2010 | Shimada et al. | 375/240.12 |
| 2011/0080952 A1 * | 4/2011 | Vadapalli et al. | 375/240.15 |

* cited by examiner

REFRESH PIXEL GROUP SELECTION AND CODING ADJUSTMENT

CROSS REFERENCE TO RELATED APPLICATIONS

This application claims priority under 35 U.S.C. 119(e) to U.S. Provisional Application 61/059,721, with a filing data of Jun. 6, 2008, and entitled "Reference Refresh Method", which is incorporated herein by reference.

FIELD OF THE INVENTION

Embodiments of the present invention relate to a video coder and, more specifically, to apparatuses and methods for improving default coding parameters.

BACKGROUND

Video coders are well known devices. They code a sequence of image data ("source video data") according to predetermined coding processes for presentation of coded video data to a channel. The coded video data often occupies less bandwidth in a channel than the source video data and, therefore, many video coders achieve a high degree of data compression. Many video coding processes are lossy processes; when coded video data is retrieved from a channel decoded, it generates recovered video data that is similar but not identical to the source video data. When source video data is coded, a video coder selects various coding parameters that can affect the quality of the recovered video data at the decoder and the bandwidth occupied by the coded video data in the channel. Additionally, the selection of coding parameters can affect the complexity of coding processes that are to be performed at the video coder and the video decoder.

FIG. 1 illustrates a functional block diagram of a basic video coder 100. A video coder 100 takes data from source video data 110 and codes the source video data 110 to produce coded video data 170 for presentation to a channel 120 to be decoded by a decoder connected to the channel 120. The video coder 100 partially codes the source video data 110 and generates partially coded data 160 and coder parameters 165 for video coder engine 150 to code the partially coded data 160 according to commonly used procedures using the coder parameters 165, e.g. quantizer parameter settings, spatial transforms, run-length coding, and entropy coding.

Typically, the coder 100 generates the partially coded data 160 and selects the coder parameters 165 to balance a set of constraints including: 1) the quality of recovered video, 2) the bit rates available from the channel 120, 3) the complexity available at the video coder 100, and 4) the complexity available at the decoder. The complexity of the decoder needs to be considered because the decoding process is performed on the decoder, and the resources available on the decoder are often limited.

The video coder 100 performs coding processes according to a coding policy to generate the partially coded data 160 and the coding parameters 165. Commonly, the coding processes operate on the source video data 110 on a frame-by-frame basis in which the video coder 100 parses a frame into a plurality of pixel groups (e.g., 8×8 or 16×16 blocks of pixels) and codes the frame on a pixel group by pixel group basis. For each pixel group being coded, the video coder 100 may attempt to predict the pixel group from other pixel groups of the current frame (I or intra coding) or from pixel groups of other frames (B, P or inter coding). The pixel groups used to predict other pixel groups may be called reference pixel groups. For example, the video coder 100 may code a pixel group by referring to a source pixel group with instructions for applying a difference (residual) to the source pixel group to get an approximation of the pixel group. (e.g., if an object such as a ball were in a scene for several seconds then pixel groups of the ball from earlier in the scene may be used to predict pixel groups later in the scene). Applying a difference may be necessary to compensate for such things as lighting changes, camera angle changes, etc. By using prediction, the video coder 100 may exploit spatial or temporal redundancy in the source video data 110 to code pixel groups with fewer pixels. However, using prediction is a lossy process, and when chains of predictions are used the quality of the recovered video on the decoder may suffer due to propagation errors, and transmission errors may corrupt not only a current frame but also all the frames that are predicted from the current frame. One way to reset these types of errors is to send an I frame, or a frame with pixel groups that only refers to other pixel groups in the current frame. The decoder is reset, because the decoder may only refer to frames after the I frame.

Thus, video coders 100 according to a coding policy assign certain frames from the source video data 110 to be reference frames for prediction purposes whereas others may not be so assigned. The video coder 100 according to a coding policy may also select coder parameters 160 for video coder engine 150 to code the partially coded data 160 according to commonly used procedures, e.g. quantizer parameter settings, spatial transforms, run-length coding, and entropy coding. Quantization parameter selections can strongly influence bandwidth consumption and image quality in recovered video data. Generally speaking, higher quantization parameters can achieve higher compression ratios but can also lower quality of recovered image data. Therefore, the selection of quantization parameters (and other coder parameters) can be influenced by performance constraints such as channel bit rate limits and image quality requirements.

The coded video data 170 is transmitted across the channel 120 to a decoder. The coded video data 170 may be merged into a channel bitstream with data of other pixel groups and frames and with coded data representing other artifacts of the image sequence (such as audio). During transmission the coded video data 170 may be corrupted due to transmission errors relating to the channel 120 and/or the decoder.

When an (intra-coded)I frame is used in video coding, it may reset the state of a video decoder. However, the I frames typically are large compared to inter-coded frames and, therefore, they consume much more bandwidth. The inventors of the present application believe that modern coding processes do not require transmission of intra-coded frames that completely reset a video sequence. Instead, it may be useful to perform such reset operations on a pixel group by pixel group basis. In doing so, it may be useful to base such reset operations on a determination of how often pixel groups of frames are referenced by the encoding of other pixel groups in determining the quality of coding to use for pixel groups. Accordingly, there is a need in the art for apparatuses and methods to reduce the need to send I frames to reset the state of a video decoder by identifying pixel groups for enhanced coding and then enhancing the coding of the identified pixel groups.

DETAILED DESCRIPTION

Embodiments of the present invention provide apparatuses and methods for improving the coding of video data. A coder may code video data according to a default coding policy to produce coded video. The coded video may include reference pixel groups which are pixel groups used as sources of prediction for other pixel groups. The coder then may select reference pixel groups from the coded video to be refresh pixel groups. The coder then may modify the coding of the refresh pixel groups to code the refresh pixel groups to a predetermined quality of coding according to a refresh coding policy to produce refreshed coded video. The coder then may output to a channel the refreshed coded video. The refresh coded video can provide advantages similar to intra-coded frames but at reduced bandwidth consumption because the refresh coding is applied to a smaller portion of a frame, i.e. at a pixel group level.

Figure 1:
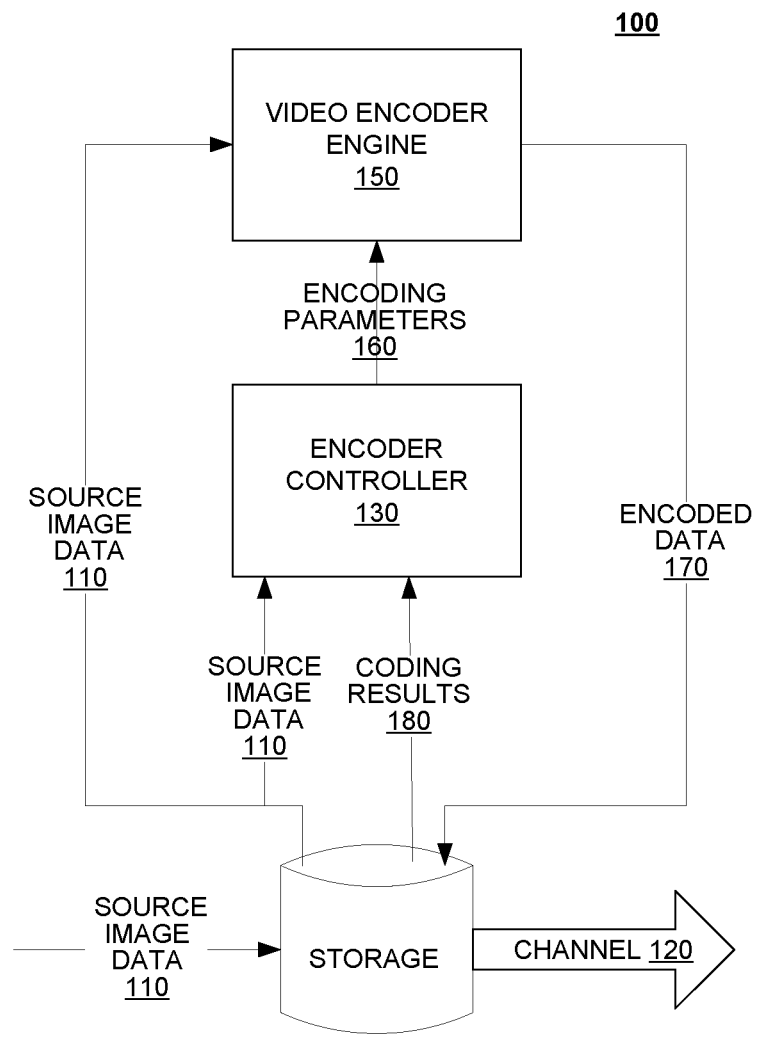
FIG. 1 illustrates a basic video coder.
Figure 2:
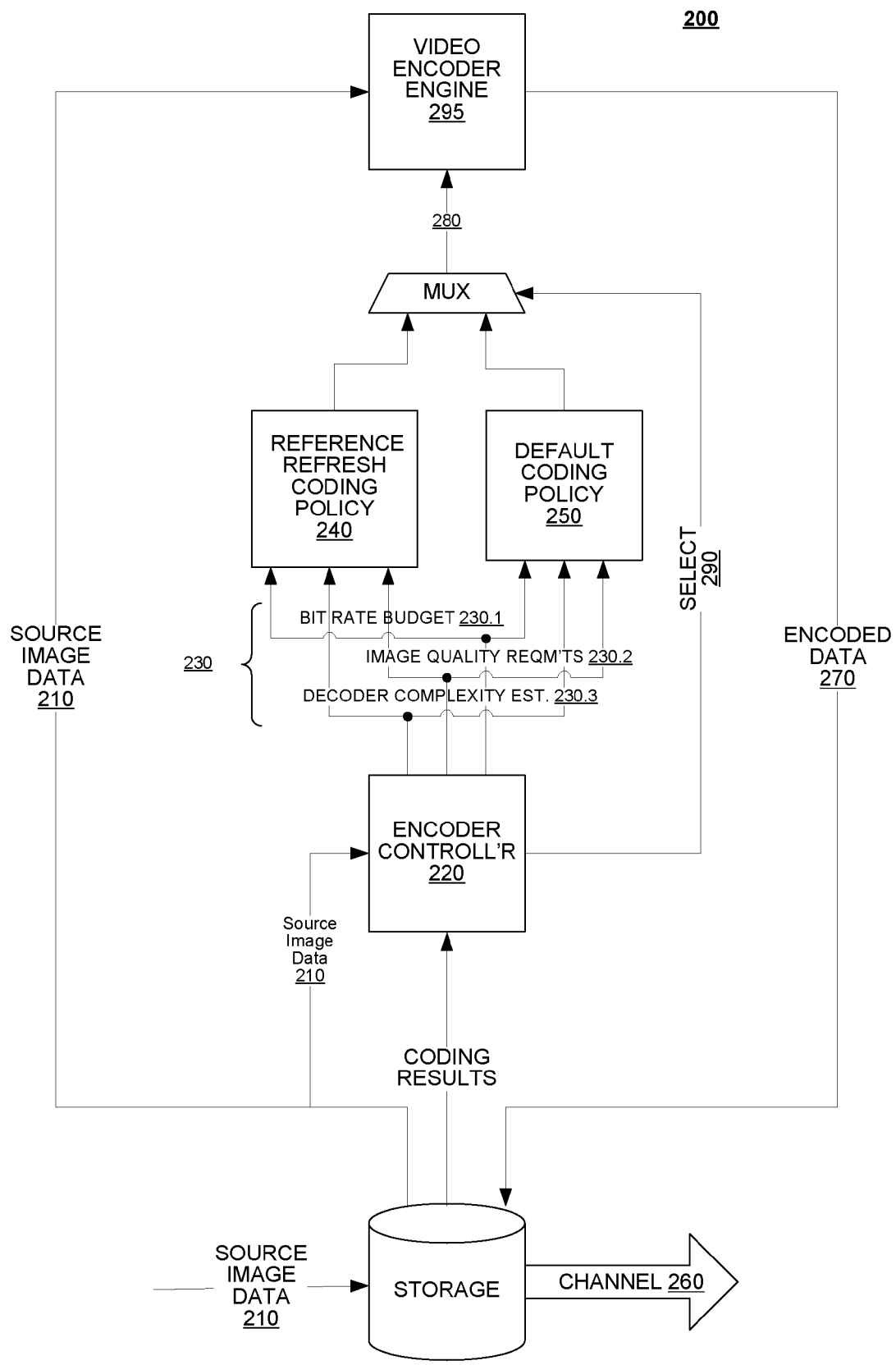
FIG. 2 is a functional block diagram of a coder to code source video data according to an embodiment of the present invention.

FIG. 2 is a functional block diagram of a coder 200 to code source video data 210 according to an embodiment of the present invention. The coder 200 may include a coder controller 220. The source video data 210 may be examined by the coder controller 220. The coder controller 220 then may calculate coding constraints 230 including bit rate budget 230.1, image quality requirements 230.2 and coder complexity estimate 230.3. The coder controller 220 then may generate a refresh coding policy 240 and a default coding policy 250 based on the coding constraints 230. The coder controller 220 then may perform coding processes on the source video data 210 and generate partially-coded data 292 coder parameters 294 according to the refresh coding policy 240 and partially coded data 296 and coder parameters 298 according to the default coding policy 250. The coder controller 220 may then select between the partially coded data 292 and coder parameters 294, and the partially coded data 296 and coder parameters 298. The video coder engine 295then may code the selected partially coded data 280 according to the coder parameters 285. Then the coded data 270 may be transmitted over a channel 260 to a decoder (not illustrated.)

In an embodiment, the encoder controller 220 may iterate one or more times by reapplying the default coding policy 250 and/or the refresh coding policy 240 to the partially coded data 292 296 and/or the coder parameters 294, 298.

Figure 3:
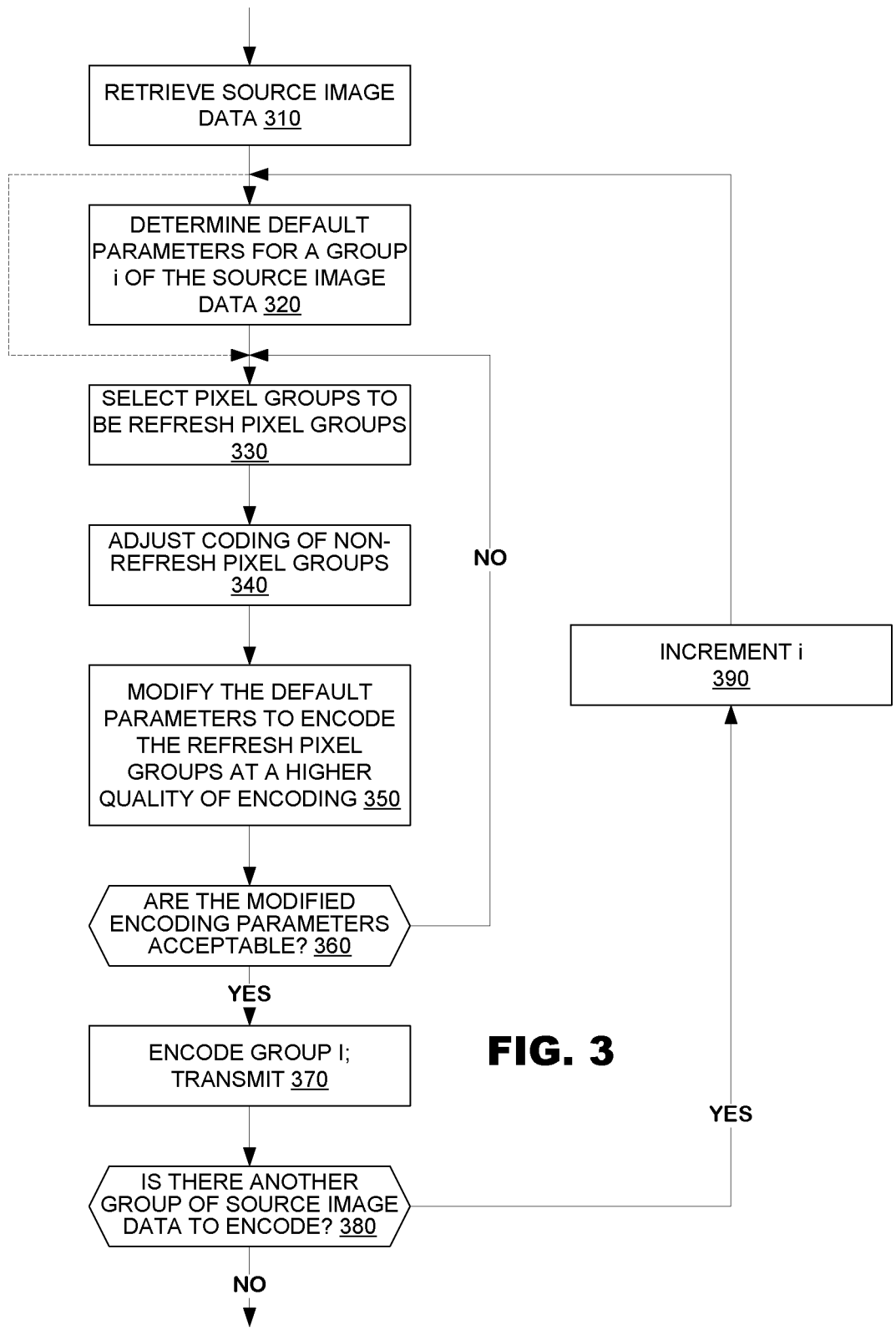
FIG. 3 illustrates an embodiment of a method for encoding video data using a refresh method.

FIG. 3 illustrates an embodiment of a method for encoding video data using a refresh method. The method begins at step 310 with retrieving source video data. The method optionally continues at step 320 with coding video data according to a default coding policy to produce coded video data for a group I of video data. The coder, according to the default coding policy, may generate partially coded video data and coder parameters. This may involve many processes including splitting the source video data into groups for coding(e.g., a number of frames of the video data may be grouped together, and then each frame may be coded pixel group by pixel group.) In an embodiment, the coder may predict pixel groups using other pixel groups and thus generate reference pixel groups, which are pixel groups that are used to predict other pixel groups. Some pixel groups may be used to predict multiple pixel groups. Frames may have multiple pixel groups. Pixel groups in a frame may be predicted from pixel groups in the same frame or pixel groups in different frames. If all the pixel groups are predicted from pixel groups in the same frame, then the frame is an I (intra-frame.) If some of the pixel groups are predicted from other frames, then the frame is an inter-coded frame (e.g. B or P frame.)In an embodiment, the coder according to the default coding policy calculates a predictability of a temporal sequence of pixel groups (e.g. co-located or connected through motion detection.)For example, the coder may calculate whether the predictability of a temporal sequence of video data is high, medium, or low. In an embodiment, the coder divides the video data into segments based on the predictability of the source video data. In an embodiment, the coder calculates perceptual models, texture information, and/or motion.

The coder may generate the partially coded video data and coder parameters iteratively after modifications have been made to encode refresh pixel groups at a higher quality of coding. In an embodiment, the coder may calculate known errors in the encoder and/or the decoder. In an embodiment, the coder calculates the distance of previous refresh pixel groups and/or I frames. In an embodiment, the coder identifies portions of the frame that should be given more importance. For example, in video data including a talking person the mouth of the person may be identified to be more important. In an embodiment, the coder selects macroblocks. The coder may calculate an importance of the macro blocks. In an embodiment, the coder may share the video data between two devices with some of the data being independent to a first device and some of the data being independent to a second device, and some of the data being shared between the two devices. The coder may identify the video data that is shared between the two devices. Method and apparatuses for sharing video data are disclosed in a related application, U.S. Provisional Application 61/079,373, with a filing data of Jul. 9, 2008, and entitled "Video Streaming Using Multiple Channels", which is incorporated herein by reference.

In an embodiment, the coder, according to refresh coding policy, may generate partially coded video data and coder parameters. The refresh coding policy may include the default coding policy.

The method continues at step 330 with selecting pixel groups from the coded video to be refresh pixel groups. The coder, according to the refresh coding policy, may select refresh pixel groups in a number of different ways. In an embodiment, the refresh pixel groups are selected based on the number of pixel groups that reference the refresh pixel groups. The selection may be based on inter and/or intra references to the refresh pixel groups, i.e. the number of other pixel groups predicted from the pixel group. In an embodiment, after refresh pixel groups have been selected to be refresh pixel groups, if the refresh pixel groups are encoded with motion vectors, both the pixel groups that refer to the selected refresh pixel groups and the pixel groups that are referred to by the refresh pixel group may be selected as refresh pixel groups to receive enhanced coding. In an embodiment, after refresh pixel groups have been selected, if the refresh pixel groups are intra-coded, then pixels that are related to the refresh pixel groups by the intra-coding may be selected as refresh pixel groups to receive enhanced encoding. In an embodiment, after refresh pixel groups have been selected, and a selected mode has been selected, pixel groups that are related to the refresh pixel groups by the selected mode may be selected as refresh pixel groups to receive enhanced encoding. In an embodiment, the refresh pixel groups are selected based on the predictability of a temporal sequence of pixel groups. For example, refresh pixel groups are less likely to be selected for low-motion highly predictable video segments and high motion unpredictable video segments compared with medium motion medium predictable segments. In an embodiment, refresh pixel groups may be selected whose predictability is very different from those of the surrounding pixel groups. For example, if a neighborhood of pixel groups are well predicted except one pixel group, the one poorly predicted pixel group can be selected to be refreshed.

In an embodiment, the source video data may be partitioned into segments based on the motion predictability, and refresh pixel groups are selected at the beginning of prediction chains to improve the quality of the image at the head of the prediction chains. In an embodiment, the refresh pixel groups are selected based on perceptual models, texture information, and/or motion. For example, a background that is calculated to be not important for the video data may be less likely to be selected as refresh pixel groups. In an embodiment, the refresh pixel groups may be selected to compensate for known errors of the encoder and/or decoder. In an embodiment, the refresh pixel groups may be selected based on the distance of previous refresh pixel groups and/or I frames. In an embodiment, the refresh pixel groups may be selected based on a calculated propagation error for the pixel group. For example, if a pixel group is predicted from another pixel group from a chain of pixel groups, the coder may calculate that the propagation error is high, and select the pixel group to be a refresh pixel group to lower the propagation error. In an embodiment, the refresh pixel groups may be selected based on portions of the frame that are given more importance. For example, in video data including a talking person the mouth of the person may be more likely to be selected as refresh pixels. In an embodiment, the refresh pixel groups may be selected based on an importance assigned to macroblocks. Macroblocks may be selected to have their coding quality lowered and other macroblocks may be selected to be refresh pixel groups. In an embodiment, refresh pixel groups are selected based on the coincidence of pixel groups. The pixel groups that are coincident with two or more video data streams are more likely to be selected as refresh pixel groups.

In an embodiment, refresh pixel groups may be selected based on their location within the frame and based on the location of other pixel groups selected as refresh pixel groups. For example, the coder may select a pixel groups based on its location in the frame so that all the locations within the frame are refreshed during some unit of time or number of frames.

Adjusting the degree to which a pixel group of one or more members is refreshed (i.e. how well it is coded, or how many resources—bits, power, memory—are used to code it) may depend on a number of criteria. In an embodiment, the degree of refreshing for a first pixel group may be controlled to vary based on the number of other pixel groups that have prediction dependencies that rely on the first pixel group. In an embodiment, the degree of refreshing depends on the degree to which the dependent pixel groups are well predicted (temporally or spatially), measured often by the quantity of residual data to be coded following prediction. In another embodiment, the degree of refreshing depends on the degree to which a pixel group is unpredictable relative to the surrounding pixel group. For example, a pixel group that is poorly predicted temporally or spatially and that is surrounded by other pixels groups that are better predicted temporally or spatially can be refreshed so that visual quality is consistent across the pixels groups.

The method continues to step 340, with adjusting the coding of non-refresh pixel groups. Non-refresh pixel groups that depend on a refresh pixel group can be coded with different parameters than those used to code the refresh pixel group. Quantization parameters (often higher), decode or encode complexity of the tools (often lower), and other such coding parameters can be adjusted non-refresh pixel groups to be different from that of refresh pixel groups. The degree to which these parameters can be adjusted for a non-refresh pixel group can depend on it's predictability, how far away it is from the last refresh picture group, perceptual metrics, and so on.

The method continues at step 350 with modifying the coding of the refresh pixel groups to code the refresh pixel groups to a predetermined quality of coding. The coder may according to the refresh coding policy modify the coding of the selected refresh pixel groups to a predetermined quality of coding in a number of ways. In an embodiment, the quantization to be applied to the refresh pixel groups is modified to a finer quantization. In an embodiment, the motion vectors used to code the refresh pixel groups are modified to use alternative motion vectors under different motion estimation strategies. In an embodiment, the mode selection used to code the refresh pixel groups is modified to use alternative prediction mode selection strategies. In an embodiment, the macroblock coding modes used to code the refresh pixel groups are modified to use alternative macroblock coding modes. In an embodiment, the macroblock decision strategies used to code the refresh pixel group is modified to use different macroblock mode decision strategies. In an embodiment, the bit stream elements used to encode the refresh pixel groups are modified to use bit stream elements that incur higher decoder complexity. In an embodiment, the coding time used to code the refresh pixel groups is modified to incur longer coding time to make higher quality pixel groups. In an embodiment, the coding used to code pixel groups not selected as refresh pixel groups is lowered to enable the modification of the coding of the refresh pixel groups. In an embodiment, the modifications to the coding of the refresh pixel groups is achieved under the encoding constraints. The modification to the coding of the refresh pixel groups may be called enhancements to the coding of the refresh pixel groups.

The method continues at step 360 with calculating whether the modified coding is acceptable. The coder may examine the modified coding, which may include modifications to the partially coded video data and/or the coder engine parameters, with the coding constraints to calculate whether or not the constraints have been exceeded and/or whether or not the coding constraints would permit additional modifications to the coding. Additionally, the coder may examine the modified coding to calculate whether or not another iteration of the coder according to the refresh coding policy and/or the default coding policy may improve the coding of the video data. The motion estimation stage, the intra prediction stage, and/or the mode decision stage may be changed as a result of the iteration. Both the refresh coding policy and/or the default coding policy may recognize the refresh pixel groups and maintain modified coding for the refresh pixel groups. The iteration of coding may use fewer I frames due to the modified coding of the refresh pixel groups. Thus, the refresh pixel groups may be selected and modified by using a multi-pass coding strategy.

The method continues at step 370 with coding the group i of the source image data. The coder may use the modified coder engine parameters to code group i of the source video data. In an embodiment, the coder may select either the modified coder engine parameters or the coder engine parameters. In an embodiment, the coder may use coder engine parameters according to the default coding policy and/or according to the refresh coding policy. The coded video may be output from the encoder. In an embodiment, the coded group i of source video data may be transmitted on a channel to a decoder.

The method continues at step 380 with calculating whether there is another group of source video data to encode. If there is more source video data to encode, then the method increments i at 390 and then returns to step 320 to begin encoding the next group i of the source image data. If there is no more source image data to encode then the method terminates. In an embodiment, the method may transmit the encoded source image data to a decoder using a channel after encoding all the source image data. The flow ends if there is no more source image data to encode.

Figure 4:
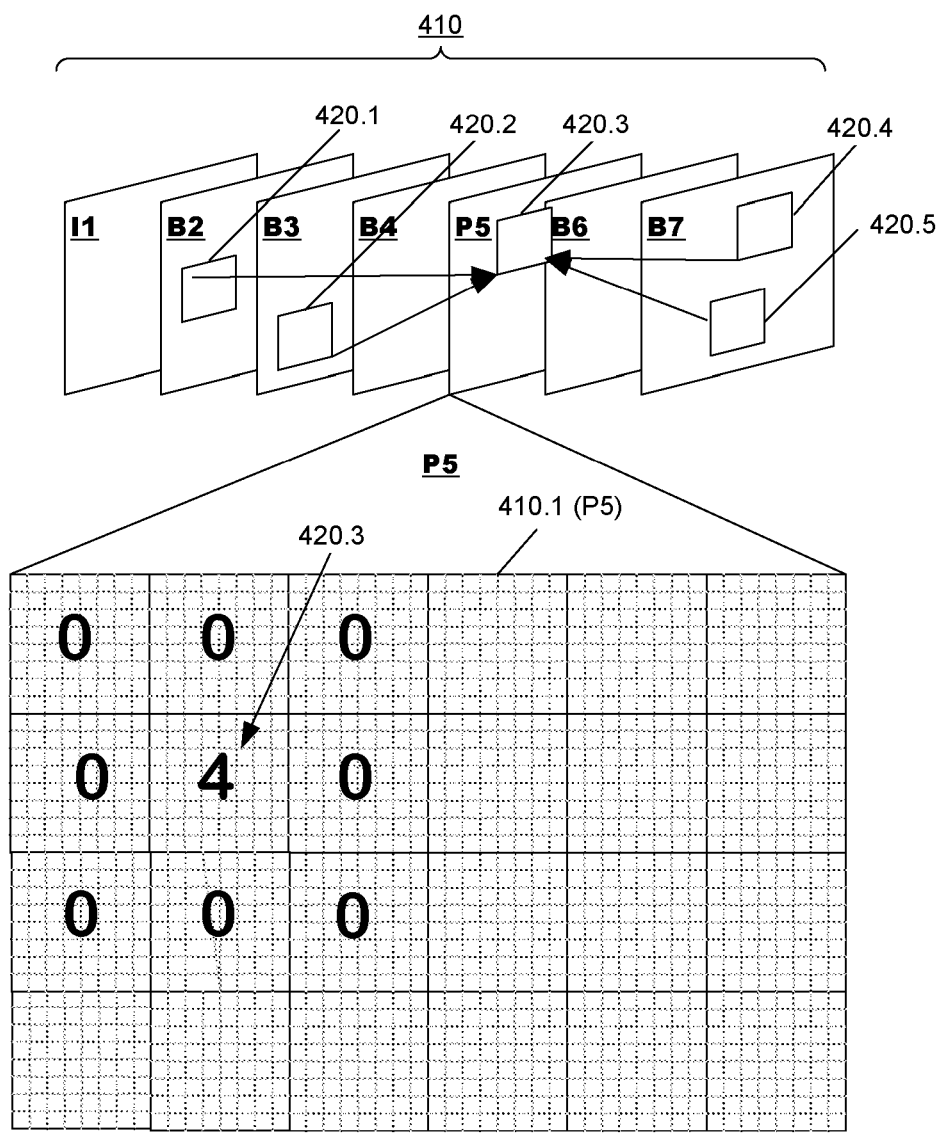
FIG. 4 illustrates reference pixel groups selected as refresh pixel groups based on the number of times the default encoding parameters refer to the reference pixel groups.

FIG. 4 illustrates an exemplary sequence 410 of image data and a pixel group selected as a refresh pixel group based on the number of times other pixel groups were predicted from the selected refresh pixel group. The coder first partially codes the source video data to generate the frames 410 (shown as I1, B2, B3, B4, P5, B6). Some of the pixel groups 420 were predicted from other pixel groups in the coding. So, for example, pixel group 420.1 of frame B2 is shown as predicted from pixel group 420.3 of frame P5. Pixel groups that were used to predict other pixel groups may be called reference pixel groups. Pixel group 420.3 was used to predict 4 (four) other pixel groups and thus is a reference pixel group. Additionally, the coder according to the refresh coding policy selected pixel group 420.3 to be a refresh pixel group based on the number of other pixel groups predicted from pixel group 420.3. The coding of pixel group 420.3 may be then modified using one of the methods described herein to improve the coding of pixel group 420.3.

Figure 5:
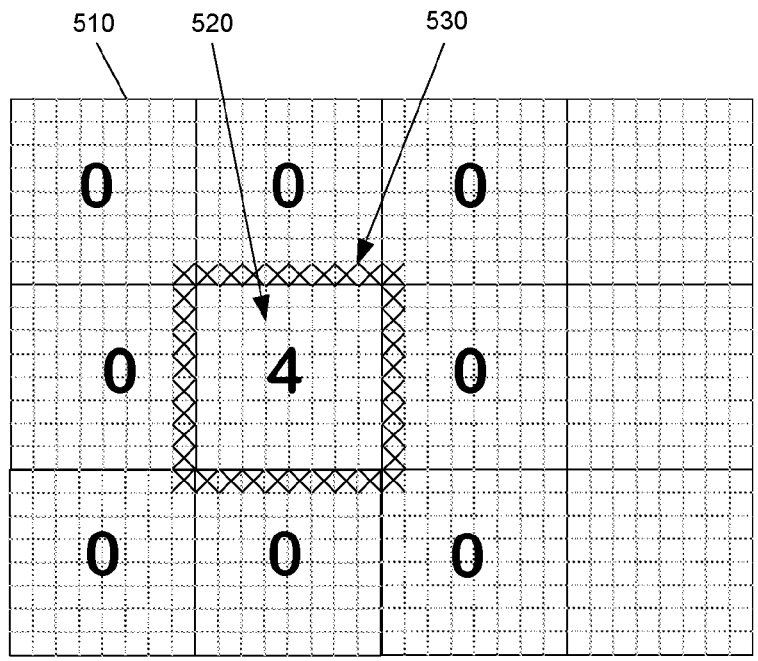
FIG. 5 illustrates the selection of pixels to receive enhanced encoding based on being used to encode a pixel group selected as a refresh pixel group.

FIG. 5 illustrates the selection of pixels to receive modified or enhanced coding based on being used to code a pixel group selected as a refresh pixel group. Frame 510 of the video data includes 12 (twelve) pixel groups with pixel group 520 whose coding depends on surrounding pixels 530. Based on being used in or affecting the coding of a pixel group 520, the neighboring pixels 530 and the blocks which include them can be selected as refresh pixel groups to have their coding modified or enhanced. In an embodiment, if pixel group 520 was predicted from a source pixel group, then the source pixel group may be selected as a refresh pixel group.

Figure 6:
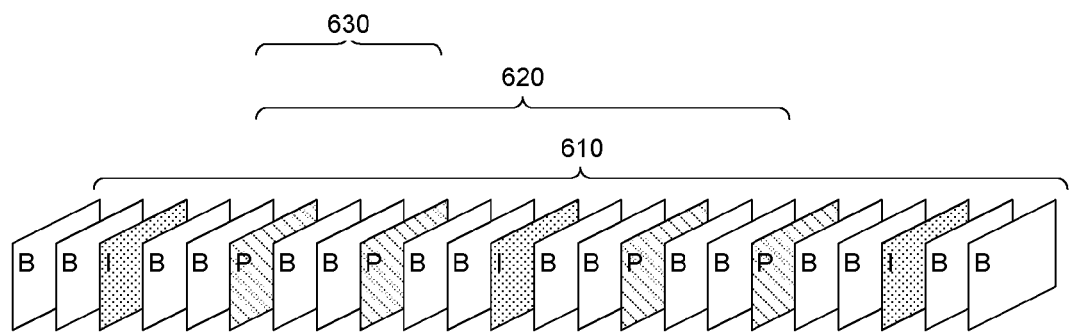
FIG. 6 illustrates that the encoder may select pixel groups at the beginning of a scene to be refresh pixel groups.

FIG. 6 illustrates that the coder may select pixel groups at the head of a dependency chain within a scene to be refresh pixel groups. The video data may be divided into a number of frames 610. The coder according to the refresh coding policy or the default coding policy identifies a scene 620 in the frames 610. Assuming that the P frames depend on temporally previous frames and that the B frames depend on temporally adjacent frames, the coder according to the refresh coding policy may then be more likely to select pixel groups at the beginning of the scene 630 to refresh pixel groups.

Figure 7:
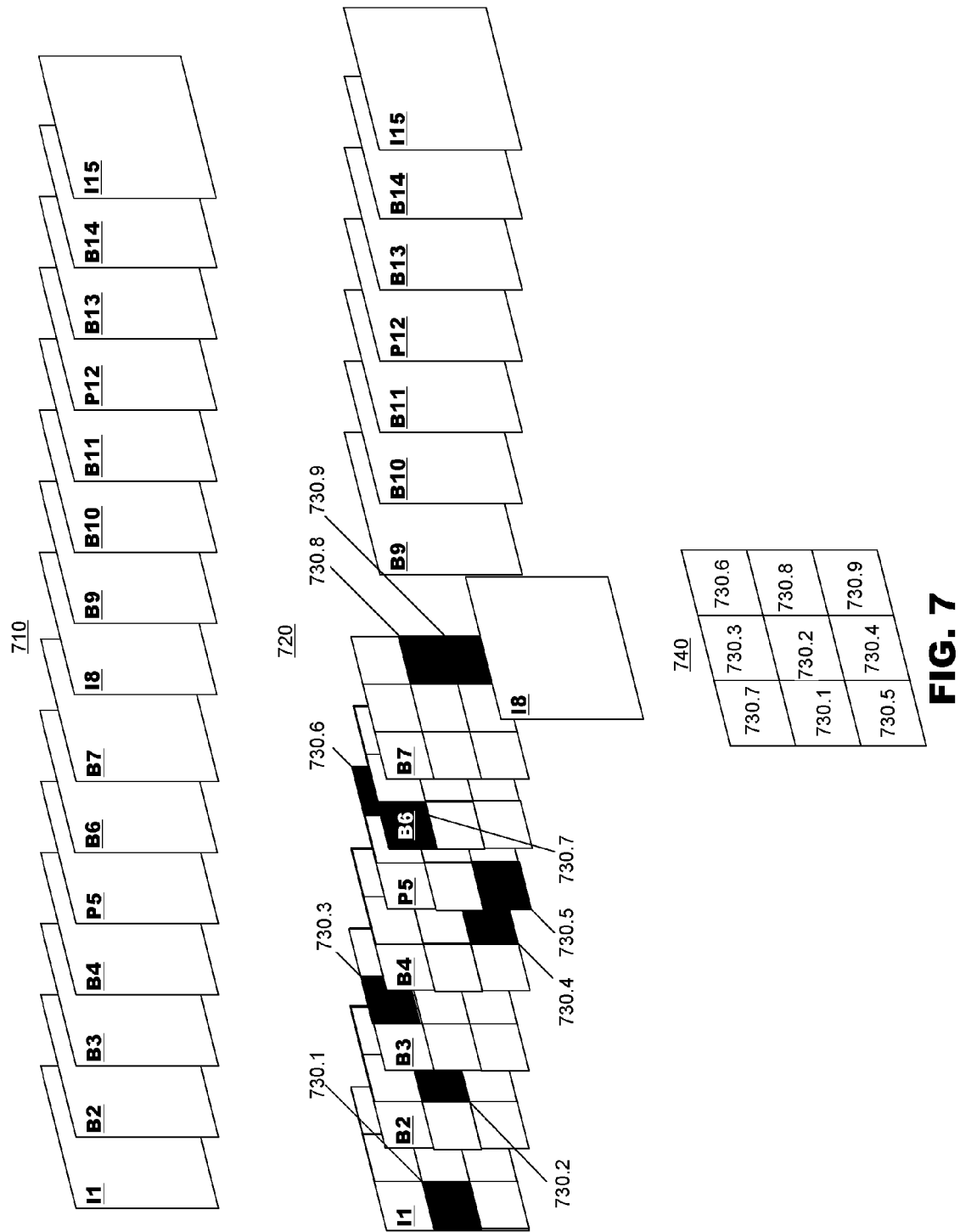
FIG. 7 illustrates that the coder may select pixel groups based on their location in a frame to be refresh pixel groups.

FIG. 7 illustrates that the coder may select pixel groups based on their location in a frame to be refresh pixel groups. In FIG. 7, the coder has split the source video data into a number of frames 710 (shown as I1, B2, B3, B4, P5, B6, B7, I8, B9, B10, B11, P12, B13, B14, and I15.) In FIG. 7, 720, illustrates the operation of the coder according to the refresh method. The coder has split each of the frames into 9 (nine) pixel groups. The coder has selected the dark pixel groups as refresh pixel group, 730.1, 730.2, 730.3, 730.4, 730.5, 730.6, 730.7, 730.8, and 730.9. In selecting pixel group 730.8 and/or 730.9, the coder may consider the position of the pixel groups in relation to other pixel groups that have been selected as refresh pixel groups according to a predetermined metric. (For example, the predetermined metric may have been since the last I frame was sent.) Element 740 illustrates the relative positions of the selected refresh pixel groups since the last I frame. As illustrated, the selection of 730.8 and 730.9 may enable the coder to not send an I frame I8 since each of the pixel groups areas has been refreshed since the last I frame, I1, was sent. Thus, pixel groups may be selected as refresh pixel groups based on the position of the pixel group relative to other pixel groups selected as refresh pixel groups.

Figure 8:
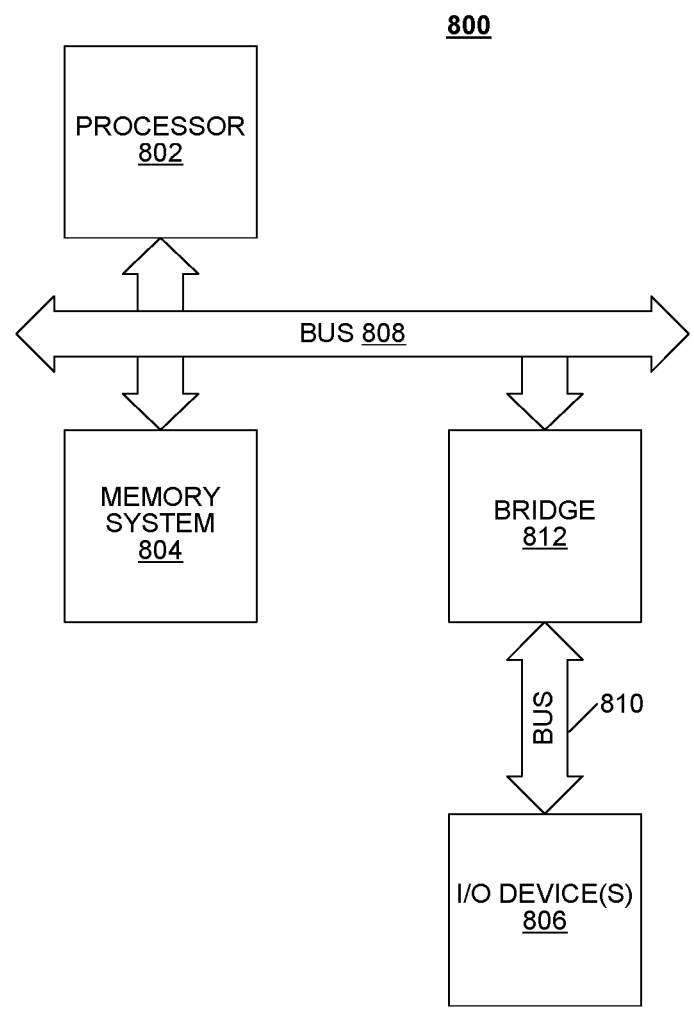
FIG. 8 is a simplified functional block diagram of a computer system.

FIG. 8 is a simplified functional block diagram of a computer system 800. An encoder and decoder of the present invention can be implemented in hardware, software or some combination thereof. For example, an encoder and/or decoder of the present invention can be implemented using a computer system.

As shown in FIG. 8, the computer system 800 includes a processor 802, a memory system 804 and one or more input/output (I/O) devices 806 in communication by a communication fabric. The communication fabric can be implemented in a variety of ways and may include one or more computer buses 808, 810 and/or bridge devices 812 as shown in FIG. 8. The I/O devices 806 can include network adapters and/or mass storage devices from which the computer system 800 can receive compressed video data for decoding by the processor 802 when the computer system 800 operates as a decoder. Alternatively, the computer system 800 can receive source video data for encoding by the processor 802 when the computer system 800 operates as an encoder.

By using the apparatuses and methods described herein larger I, P, and B frames than standard encoding parameters encode may be generated. By using the methods described herein apparatuses higher quality encoding can be achieved without breaking prediction dependencies.

It should be understood that there exist implementations of other variations and modifications of the invention and its various aspects, as may be readily apparent to those of ordinary skill in the art, and that the invention is not limited by specific embodiments described herein. Features and embodiments described above may be combined. It is therefore contemplated to cover any and all modifications, variations, combinations or equivalents that fall within the scope of the basic underlying principals disclosed and claimed herein.

We claim:

1. A method of coding video data, comprising:
   selecting pixel groups from the video to be coded as refresh pixel groups, wherein over a predetermined span of frames at least one refresh pixel group covers each pixel group location of the video, the selection of each refresh pixel group being based on a calculated number of pixel groups that depend on the refresh pixel group;
   adjusting the coding of the refresh pixel groups to code the refresh pixel groups to a predetermined quality of coding according to a refresh coding policy to produce refreshed coded video, wherein coding parameters and a rate of refreshing are adjusted based on the calculated number of pixel groups;
   adjusting the coding of non-refresh pixel groups to code the non-refresh pixel groups to a predetermined quality of coding according to a non-refresh coding policy to produce non-refreshed coded video; and
   outputting to a channel the refreshed coded video.

2. The method of claim 1, wherein the selecting further comprises:
   computing the predictability of a plurality of pixel groups from the video,
   selecting pixel groups to be the refresh pixel groups based on their computed predictability.

3. The method of claim 1, wherein adjusting the coding of the refresh pixel groups further comprises:
   calculating the predictability pixel groups that depend on the refresh pixel group,
   selecting coding parameters of the refresh pixel group based on the predictability of the pixel groups that are dependent on the refresh pixel group.

4. The method of claim 1, wherein adjusting the coding of the refresh pixel groups further comprises:
   calculating the predictability of the refresh pixel groups and pixel groups surrounding the refresh pixel group,
   selecting coding parameters of the refresh pixel group to achieve consistent coding quality across the refresh pixel groups and the surrounding pixel groups.

5. The method of claim 4, whereby the surrounding pixel groups are temporally adjacent to the refresh pixel group.

6. The method of claim 4, whereby the surrounding pixel groups are spatially adjacent to the refresh pixel group.

7. The method of claim 4, whereby the surrounding pixel groups are related to the refresh pixel group through a dependency chain.

8. The method of claim 1, wherein adjusting the coding of the non-refresh pixel groups further comprises:
   determining a dependency chain distance between a non-refresh pixel group and a refresh pixel group on which the non-refresh pixel group depends,
   selecting coding parameters of the non-refresh pixel group based on the dependency chain distance.

9. The method of claim 1, wherein adjusting comprises coding the refresh pixel groups as intra-coded data.

10. The method of claim 1, wherein adjusting the coding of the non-refresh pixel groups further comprises:
    calculating the predictability of the non-refresh pixel groups and pixel groups surrounding the non-refresh pixel group,
    selecting coding parameters of the non-refresh pixel group based on the calculated predictability.

11. The method of claim 1, wherein adjusting the coding of the non-refresh pixel groups further comprises:
    calculating perceptual metrics of pixel groups surrounding the non-refresh pixel group,
    selecting coding parameters of the non-refresh pixel group based on the calculated perceptual metrics.

12. The method of claim 1, further comprises:
    calculating whether the refreshed coded video is acceptable, and if the refreshed coded video is not acceptable then iterating by coding the refreshed coded video according to a default coding policy, the iteration of the default coding policy eliminating an I frame.

13. The method of claim 1, wherein selecting refresh pixel groups further comprises:
    selecting refresh pixel groups based on the number of pixel groups that reference the refresh pixel groups.

14. The method of claim 1, wherein selecting refresh pixel groups further comprises:
    selecting refresh pixel groups based on the predictability of a temporal sequence of pixel groups that includes the refresh pixel groups.

15. The method of claim 1, where selecting refresh pixel groups further comprises:
    selecting refresh pixel groups based on at least one of: perceptual models, texture information, and motion.

16. The method of claim 1, where selecting refresh pixel groups further comprises:
    selecting refresh pixel groups based on a distance from previously selected refresh pixel groups.

17. The method of claim 1, where selecting refresh pixel groups further comprises:
    selecting refresh pixel groups based on portions of the video data with more importance.

18. The method of claim 1, where selecting refresh pixel groups further comprises:
    dividing the video data into macroblocks, the macroblocks being a number of pixel groups;
    assigning an importance to the macroblocks;
    selecting refresh pixel groups based on the importance of the macroblocks;
    modifying the coding to improve an encoding quality for a refreshed macroblock.

19. The method of claim 1, where selecting refresh pixel groups further comprises:
    selecting refresh pixel groups based on portions of the video data that are coincident with two or more video data streams.

20. The method of claim 1, wherein outputting further comprises:
    selecting between a refresh coding and a non-refresh coding of pixel groups;
    if the non-refresh coding is selected then outputting to the channel the non-refresh coding,
    otherwise outputting to the channel the refresh coding.

21. The method of claim 1, wherein adjusting the coding of the refresh pixel groups further comprises:
    adjusting the coding of the refresh pixel groups to intra-code the refresh pixel groups to a predetermined quality of coding according to a refresh coding policy to produce refreshed coded video.

22. A system for encoding video data, comprising:
    a processor operable to:
    select pixel groups from the video to be coded as refresh pixel groups, wherein over a predetermined span of frames at least one refresh pixel group covers each pixel group location of the video, the selection of each refresh pixel group being based on a calculated number of pixel groups that depend on the refresh pixel group;
    adjust coding of the refresh pixel groups to code the refresh pixel groups to a predetermined quality of coding according to a refresh coding policy to produce refreshed coded video, wherein coding parameters and a rate of refreshing are adjusted based on the calculated number of pixel groups;
    adjust the coding of non-refresh pixel groups to code the non-refresh pixel groups to a predetermined quality of coding according to a non-refresh coding policy to produce non-refreshed coded video; and
    output the refreshed coded video and the non-refreshed coded video to a channel.

23. The system of claim 22, wherein the selection further comprises:
    computing the predictability of a plurality of pixel groups from the video,
    selecting pixel groups to be the refresh pixel groups based on their computed predictability.

24. The system of claim 22, wherein the adjustment of coding of the refresh pixel groups further comprises:
    calculating the predictability pixel groups that depend on the refresh pixel group, selecting coding parameters of the refresh pixel group based on the predictability of the pixel groups that are dependent on the refresh pixel group.

25. The system of claim 22, wherein the adjustment of coding of the refresh pixel groups further comprises:
calculating the predictability of the refresh pixel groups and pixel groups surrounding the refresh pixel group,
selecting coding parameters of the refresh pixel group to achieve consistent coding quality across the refresh pixel groups and the surrounding pixel groups.

26. The system of claim 25, whereby the surrounding pixel groups are temporally adjacent to the refresh pixel group.

27. The system of claim 25, whereby the surrounding pixel groups are spatially adjacent to the refresh pixel group.

28. The system of claim 25, whereby the surrounding pixel groups are related to the refresh pixel group through a dependency chain.

29. The system of claim 22, wherein the adjustment of coding of the non-refresh pixel groups further comprises:
determining a dependency chain distance between a non-refresh pixel group and a refresh pixel group on which the non-refresh pixel group depends,
selecting coding parameters of the non-refresh pixel group based on the dependency chain distance.

30. The system of claim 22, wherein the adjustment comprises coding the refresh pixel groups as intra-coded data.

31. The system of claim 22, wherein the adjustment of coding of the non-refresh pixel groups further comprises:
calculating the predictability of the non-refresh pixel groups and pixel groups surrounding the non-refresh pixel group,
selecting coding parameters of the non-refresh pixel group based on the calculated predictability.

32. The system of claim 22, wherein the adjustment of coding of the non-refresh pixel groups further comprises:
calculating perceptual metrics of pixel groups surrounding the non-refresh pixel group,
selecting coding parameters of the non-refresh pixel group based on the calculated perceptual metrics.

33. The system of claim 22, wherein the processor is further operable to:
calculate whether the refreshed coded video is acceptable, and if the refreshed coded video is not acceptable then iterating by coding the refreshed coded video according to a default coding policy, the iteration of the default coding policy eliminating an I frame.

34. The system of claim 22, wherein the processor is further operable to select pixel groups based on the number of pixel groups that reference the refresh pixel groups.

35. The system of claim 22, wherein the processor is further operable to select refresh pixel groups based on the predictability of a temporal sequence of pixel groups that includes the refresh pixel groups.

36. The system of claim 22, wherein the processor is further operable to select refresh pixel groups based on at least one of: perceptual models, texture information, and motion.

37. The system of claim 22, wherein the processor is further operable to select refresh pixel groups based on a distance from previously selected refresh pixel groups.

38. The system of claim 22, wherein the processor is further operable to select refresh pixel groups based on portions of the video data with more importance.

39. The system of claim 22, wherein the processor is further operable to:
divide the video data into macroblocks, the macroblocks being a number of pixel groups;
assign an importance to the macroblocks;
select refresh pixel groups based on the importance of the macroblocks;
modify the coding to improve an encoding quality for a macroblock.

40. The system of claim 22, wherein the processor is further operable to select refresh pixel groups based on portions of the video data that are coincident with two or more video data streams.

41. The system of claim 22, wherein the processor is further operable to
select between a refresh coding and a non-refresh coding for the pixel groups;
if the non-refresh coding is selected then output to the channel the non-refresh coded pixel groups,
otherwise output to the channel the refresh coded pixel groups.

42. The system of claim 22, wherein the processor's adjustment further comprises:
adjusting the coding of the refresh pixel groups to intra-code the refresh pixel groups to a predetermined quality of coding according to a refresh coding policy to produce refreshed coded video.

43. A non-transitory computer-readable medium encoded with a computer-executable program to perform a method comprising:
coding video data according to a default coding policy to produce coded video, the coded video assigning refresh pixel groups, the refresh pixel groups being sources of prediction for other pixel groups, wherein over a predetermined span of frames at least one refresh pixel group covers each pixel group location of the video data;
selecting refresh pixel groups from the coded video to be refresh pixel groups, the selection of each refresh pixel group being based on a calculated number of pixel groups that depend on the refresh pixel group;
modifying the coding of the refresh pixel groups to code the refresh pixel groups to a predetermined quality of coding according to a refresh coding policy to produce refreshed coded video, wherein coding parameters and a rate of refreshing are adjusted based on the calculated number of pixel groups; and
outputting to a channel the refreshed coded video.

44. A method of coding video data, comprising:
coding video data according to a default coding policy to produce coded video, the coded video assigning refresh pixel groups, the refresh pixel groups being sources of prediction for other pixel groups, wherein over a predetermined span of frames at least one refresh pixel group covers each pixel group location of the video data;
selecting refresh pixel groups from the coded video to be refresh pixel groups, the selection of each refresh pixel group being based on a calculated number of pixel groups that depend on the refresh pixel group;
modifying the coding of the refresh pixel groups to intra-code the refresh pixel groups to a predetermined quality of coding according to a refresh coding policy to produce refreshed coded video, wherein coding parameters and a rate of refreshing are adjusted based on the calculated number of pixel groups;
outputting to a channel the refreshed coded video.

* * * * *